(12) United States Patent
Hori et al.

(10) Patent No.: US 7,649,655 B2
(45) Date of Patent: Jan. 19, 2010

(54) CARRIAGE SYSTEM

(75) Inventors: Kikuo Hori, Kyoto (JP); Takashi Nakao, Neyagawa (JP); Koichiro Oshiumi, Kyoto (JP); Akihiko Ishura, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1006 days.

(21) Appl. No.: 11/032,175

(22) Filed: Jan. 11, 2005

(65) Prior Publication Data

US 2005/0159854 A1    Jul. 21, 2005

(30) Foreign Application Priority Data

Jan. 13, 2004 (JP) .............................. 2004-005184

(51) Int. Cl.
   *H04N 1/04* (2006.01)
(52) U.S. Cl. .................... 358/497; 358/474; 358/1.9; 701/301; 701/25; 318/568.12; 250/216; 700/214; 700/230
(58) Field of Classification Search ................ 358/474, 358/497, 496, 486, 1.9; 701/19, 1, 25, 301, 701/30; 318/568.12, 568.18; 250/216, 234, 250/208.1; 700/214, 230, 215
   See application file for complete search history.

(56) References Cited

U.S. PATENT DOCUMENTS

| 4,831,540 | A | * | 5/1989 | Hesser .................... 700/113 |
| 4,907,139 | A | * | 3/1990 | Quiogue .................... 362/153 |
| 5,007,751 | A | * | 4/1991 | Yamakawa ................ 400/322 |
| 5,257,177 | A | * | 10/1993 | Bach et al. .................... 700/61 |
| 5,267,173 | A | * | 11/1993 | Tanizawa et al. ............ 700/229 |
| 5,329,449 | A | * | 7/1994 | Tanizawa et al. ............ 701/25 |
| 5,500,745 | A | * | 3/1996 | Iishiba et al. ................ 358/461 |
| 5,676,477 | A | * | 10/1997 | Tanaka et al. ............... 400/579 |
| 5,739,660 | A | * | 4/1998 | Gnann ......................... 318/626 |
| 6,041,274 | A | * | 3/2000 | Onishi et al. .................. 701/26 |
| 6,370,444 | B1 | * | 4/2002 | Kusunoki .................... 700/214 |
| 6,839,627 | B1 | * | 1/2005 | Bauch ......................... 701/209 |
| 7,310,072 | B2 | * | 12/2007 | Ronzani et al. ................. 345/8 |

(Continued)

FOREIGN PATENT DOCUMENTS

JP          63-124113 A         5/1988

(Continued)

OTHER PUBLICATIONS

Notification of Reason(s) for Refusal from Japan Patent Office dated Mar. 14, 2007 issued in corresponding Japanese Patent Application No. 2004-005184.

(Continued)

*Primary Examiner*—Houshang Safaipour
*Assistant Examiner*—Negussie Worku
(74) *Attorney, Agent, or Firm*—Westerman, Hattori, Daniels & Adrian, LLP

(57) ABSTRACT

An ID tag describing control data on a stopped position for each station 10, movement required for a transfer, and the like is installed in front of the station 10. An overhead vehicle 8 reads the control data and uses it for stoppage and transfer. The overhead vehicle 8 need not store the stoppage or transfer control data for each station 10. Further, the control data can be changed without updating the storage in the overhead vehicle 8.

3 Claims, 5 Drawing Sheets

U.S. PATENT DOCUMENTS

| | | | |
|---|---|---|---|
| 7,378,644 B2 * | 5/2008 | Kubota et al. | 250/234 |
| 7,477,963 B2 * | 1/2009 | Hon i et al. | 700/214 |
| 2004/0000890 A1 * | 1/2004 | Genma et al. | 318/638 |
| 2004/0252353 A1 * | 12/2004 | Sano et al. | 358/474 |
| 2004/0257601 A1 * | 12/2004 | Tomiyasu et al. | 358/1.9 |
| 2005/0011027 A1 * | 1/2005 | Heiniger et al. | 15/22.1 |
| 2005/0063871 A1 * | 3/2005 | Kubota et al. | 422/82.05 |
| 2008/0262668 A1 * | 10/2008 | Yamada | 701/22 |

FOREIGN PATENT DOCUMENTS

| | | |
|---|---|---|
| JP | 04-123113 A | 4/1992 |
| JP | 06-035538 A | 2/1994 |
| JP | 11-249004 A | 9/1999 |
| JP | 2001-174206 | 6/2001 |
| JP | 3367389 | 11/2002 |
| JP | 2003-139563 | 5/2003 |
| JP | 2003-156364 | 5/2003 |

OTHER PUBLICATIONS

Office Action dated Jul. 24, 2006 issued in corresponding Japanese Application No. 2004-005184.

* cited by examiner

CARRIAGE SYSTEM

FIELD OF THE INVENTION

The preset invention relates to a carriage system with an overhead vehicle, a rail guided vehicle, or a stacker crane, and in particular, to the teaching of control data concerning stopped positions and transfers. In the specification, the term stoppage control data refers to data on a position at which a carriage is stopped at a station. The term transfer control data refers to data on the amount by which each section of a transfer device moves during a transfer of an article to or from a station. The term ground side is used in contrast with a carriage side and means stations (stopped positions), a running rail, and a ground side controller for the carriage system.

BACKGROUND OF THE INVENTION

The Japanese Patent Publication No. 3367389 discloses calibration of overhead vehicles and stations in an overhead vehicle system. A large-scale system has at least 100 overhead vehicles and several hundred stations (stopped positions). When stoppage or transfer control data is calibrated for each combination of an overhead vehicle and a station, a heavy burden is imposed on the system. Accordingly, calibration is carried out using one of the overhead vehicles as a reference. Each of the other overhead vehicles stores a shift (deviation) from the reference overhead vehicle used for the calibration to correct calibration data.

When each overhead vehicle stores stoppage and transfer control data on several hundred stations, a considerably large storage capacity is required to store these data. Further, every time, for example, the arrangement of the stations is changed, the storage in a large number of overhead vehicles must be updated. It is thus cumbersome to change the arrangement of the stations or increase or delete stations.

In addition, as examples of a position sensor used for a machine tool, the Unexamined Japanese Patent Application Publication (Tokkai) No. 2001-174206, the Unexamined Japanese Patent Application Publication (Tokkai) No. 2003-139563 and the Unexamined Japanese Patent Application Publication (Tokkai) No. 2003-156364 disclose linear sensors using the magnetic coupling between coils and a magnetic mark composed of a magnetic or nonmagnetic substance or the like. When a plurality of detection coils are connected together in series and an alternating current is applied to the coils, the voltages of the detection coils change depending on the positional relationship between the magnetic mark and the coils. When the phase of each of the detection coils with respect to the magnetic mark is defined as $\theta$ and the angular speed of the alternating current flowing through the detection coils is defined as $\omega$, a signal proportional to $\sin\theta \cdot \sin\omega t$ or $\cos\theta \cdot \cos\omega t$ is obtained on the basis of the change in voltage.

SUMMARY OF THE INVENTION

It is an object of the present invention to eliminate the need to store stoppage control data in a carriage for each stopped position. It is another object of the present invention to allow stopped positions to be easily added or changed. It is an additional object of the present invention to obtain stoppage control data as required by the carriage without the need for movement or communication. It is an additional object of the present invention to allow a position sensor for the carriage to be replaced with a new one without teaching.

The present invention provides a carriage system in which a carriage runs between predetermined stopped positions to convey an article, the system being characterized by comprising storage means provided on a ground side for storing control data required to stop the carriage at each of the stopped positions, means provided on the carriage for receiving or reading the stoppage control data from said storage means, and running control means provided on the carriage for using the control data to stop the carriage at the stopped position.

Preferably, the storage means for the control data is provided in front of each stopped position so that the carriage can read the control data from the storage means. Particularly preferably, the storage means stores both stoppage control data and transfer control data. More preferably, the storage means is provided at each stopped position, and each storage means stores stoppage and transfer control data on a stopped position behind the storage means.

Further, preferably, a position sensor is provided on the carriage, and means for storing correction data for the position sensor is provided in the position sensor. The position sensor is preferably a linear sensor using the magnetic coupling between a magnetic mark and detection coils. Particularly preferably, the linear sensor has a separate sensor head composed of detection coils or the like and a separate converting section that converts a signal from the sensor head into a position. The sensor head is provided with storage means to store correction data for the sensor head.

According to the present invention, the control data required to stop the carriage at each stopped position is stored on the ground side. Consequently, the carriage need not store this data. This serves to save the storage capacity of the carriage. It is also possible to change, for example, the arrangement of stations without being conscious of the storage in the carriage.

According to the second aspect of the present invention, the storage means for the control data is provided in front of each stopped position so that the carriage can read the control data from the storage means. Consequently, the stopped position can be determined without the need for movement or communication with a ground side controller or the like.

According to the third aspect of the present invention, the correction data for the position sensor is stored in the position sensor. This eliminates the need to carry out calibration every time the position sensor is replaced with a new one.

DETAILED DESCRIPTION OF THE PREFERRED EMBODIMENTS

The best embodiment for carrying out the present invention will be shown below.

Figure 1:
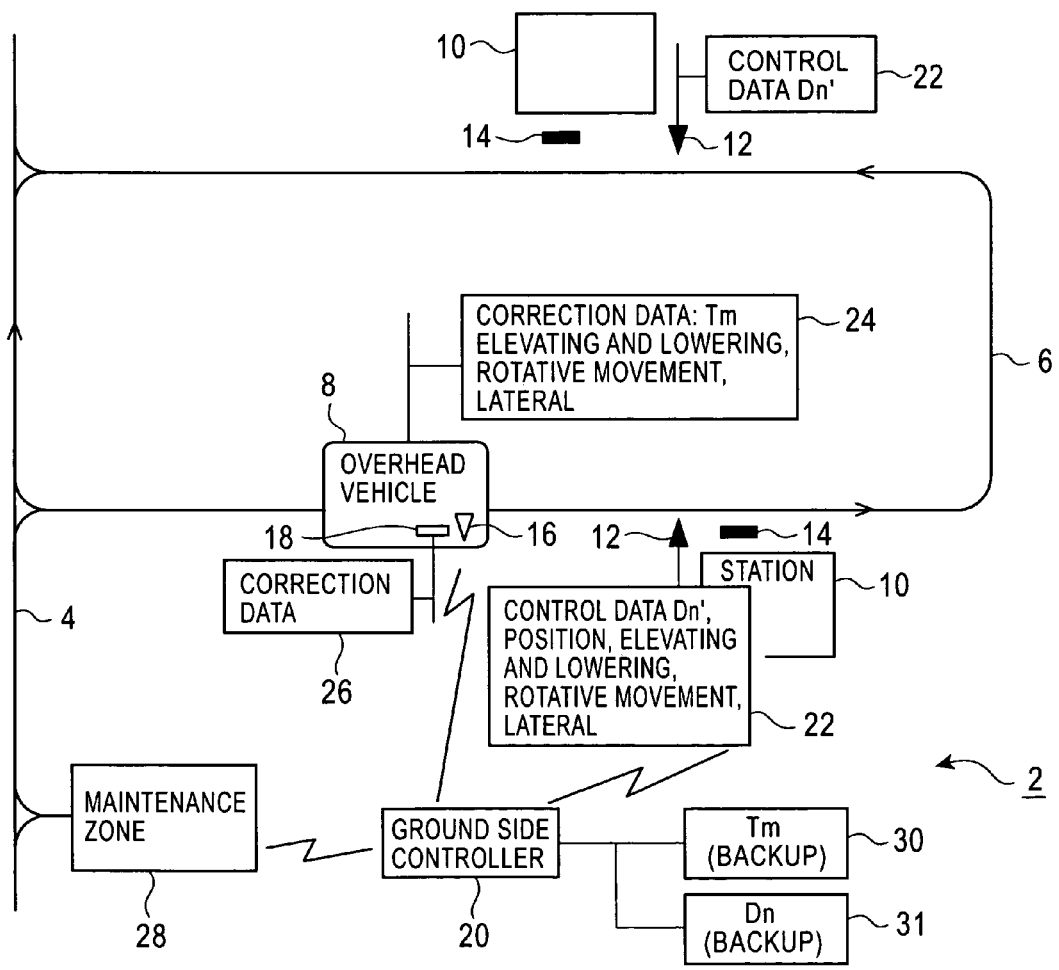
FIG. 1 is a diagram schematically showing the layout of a carriage system according to an embodiment.

FIGS. 1 to 5 show an embodiment. The embodiment describes an overhead vehicle by way of example but other carriages may be used. FIG. 1 shows the layout of an overhead vehicle system 2. A running route for an overhead vehicle 8 includes an inter-bay route 4 and an intra-bay route 6. Stations 10 such as load ports for semiconductor processing devices are provided along the routes 4, 6. 12 is an ID tag that uses a bar code or the like to describe stoppage control data that uses a detected mark 14 described later as a reference and transfer control data. The detected mark 14 is provided in front of the station 10 or between the station and a stopped position. The overhead vehicle 8 is provided with an ID reader 16 to read the stoppage or transfer control data from the ID tag 12. The overhead vehicle 8 is also provided with a linear sensor 18 to detect the absolute position of the linear sensor 18 with respect to the mark 14. 20 is a ground side controller.

A running rail for the overhead vehicle 8 is laid along the routes 4, 6 and along a high place such as a ceiling of a clean room. The overhead vehicle 8 receives electricity from the rail and communicates with the ground side controller 20 or other overhead vehicles. Tags 12 and marks 14 are provided along the running rail. The overhead vehicle 8 runs along the routes 4, 6, for example, in one direction. In the specification, an upstream side of the station 10 corresponds to a position in front of the station 10. The ID tag 12 is placed in front of the station 10, and the mark 14 is placed behind the ID tag 12. A dog or the like may be placed in front of the ID tag 12 to indicate that the ID tag 12 will appear.

The mark 14 is placed so as to be read in front of the station 10 or between the station 10 and the stopped position. The mark 14 need not be provided between the stopped positions. The overhead vehicle 8 requires data on a stopped position (stoppage control data) determined using the mark 14 as a reference, in order to perform stoppage control. For the lateral movement of a platform at the station 10, the rotative movement of a chuck portion, an elevating or lowering operation, and the like, the overhead vehicle 8 also requires transfer control data (for example, data on the amounts of the above movements). The ID tag 12 uses a bar code to optically or magnetically store these control data for each of the stations 10 in a control data storage section 22 as data for an ideal carriage.

The ID reader 16 and the linear sensor 18 are provided on one or both sides of the overhead vehicle 8. Instead of the linear sensor 18, an optical sensor may be used to read an optical mark shaped like comb teeth or the like and placed in front of the station 10 or between the station 10 and the stopped position. The optical sensor may thus determine its own absolute position. Then, the overhead vehicle 8 uses the ID reader 16 to read the control data from the ID tag 12. In accordance with the data, the overhead vehicle 8 uses the linear sensor 18 to detect its own absolute position with respect to the mark 14. The overhead vehicle 8 then stops without creep running. Further, the overhead vehicle 8 transfers an article to and from the station 10 in accordance with the control data.

The overhead vehicle 8 is provided with an overhead vehicle correction data storage section 24 to store its own correction data Tm with respect to the ideal carriage. The correction data Tm contains transfer control data on elevation and lowering, rotative movements, lateral operations, and the like. Further, the linear sensor 18 is provided with a linear sensor correction data storage section 26 to store correction data for the sensor head of the linear sensor 18. Moreover, a maintenance zone 28 is provided along the route 4 or the route 6 to carry out calibration relating to, for example, transfers carried out by the overhead vehicle 8. The overhead vehicle that can transfer an article to or from the maintenance zone 28 with a zero correction amount is the ideal carriage. The calibration at the maintenance zone 28 may involve not only the transfer control data but also the stoppage control data. The ground side controller 20 is provided with backup data storage sections 30, 31. The storage section 30 stores the correction data Tm for the overhead vehicle 8. The backup data storage section 31 stores stoppage and transfer control data Dn for each station 10.

Figure 2:
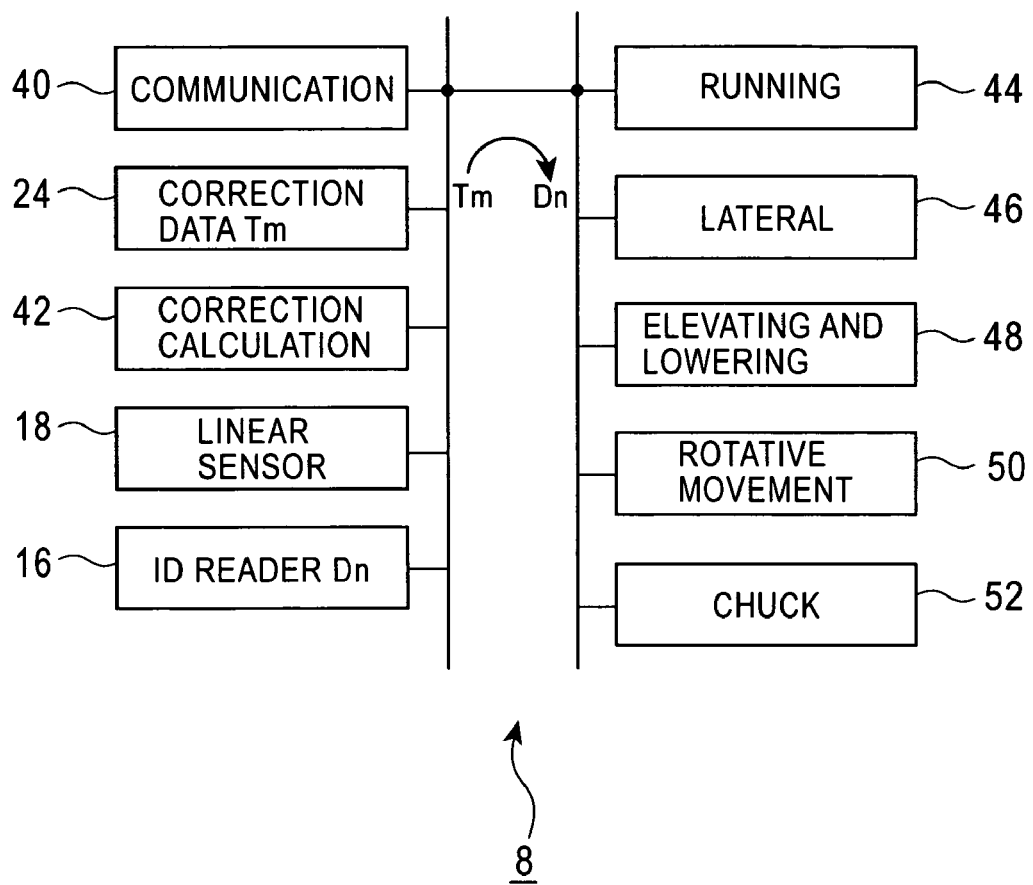
FIG. 2 is a block diagram of a carriage used in the embodiment.

FIG. 2 shows the configuration of the overhead vehicle 8. A communication section 40 utilizes a communication line laid along the routes 4, 6 and also used as an electricity feeding line to communicates with other overhead carriers and the ground side controller 20. The overhead vehicle correction data storage section 24 stores transfer correction amount Tm with respect to the ideal carriage. The linear sensor 18 already stores the correction data and outputs corrected data. Accordingly, stop control data in Tm is (1, 1, 1 . . . ) or the like. A correction calculating section 42 uses the correction data Tm and the control data Dn for each station which is read using the ID reader 16, to calculate actual stoppage and transfer control data. For example, when the data Tm, Dn are described in a matrix form, the actual data is denoted as Tm·Dn. The linear sensor 18 detects the mark 14 to determine its own absolute position with respect to the mark 14 as previously described. The ID reader 16 reads the control data Dn from the ID tag 12, placed in front of the mark 14.

A mechanism system of the overhead vehicle 18 includes a running driving section 44, a lateral driving section 46, an elevating and lowering driving section 48, a rotative movement section 50, and a chuck portion 52. Control amounts for these sections are supplied in the form of Tm·Dn. The running driving section 44 controls the stoppages of the overhead vehicle 8 so that the vehicle 8 can stop at a predetermined position without creep running. The lateral driving section 46 moves the elevating and lowering driving section 48 laterally relative to the routes 4, 6 in a predetermined direction. The elevating and lowering driving section 48 elevates and lowers the chuck portion 52 by a predetermined amount in accordance with the date Tm·Dn. The rotative movement section 50 rotatively moves the chuck portion 52 through a predetermined angle in accordance with the data Tm·Dn.

Figure 3:
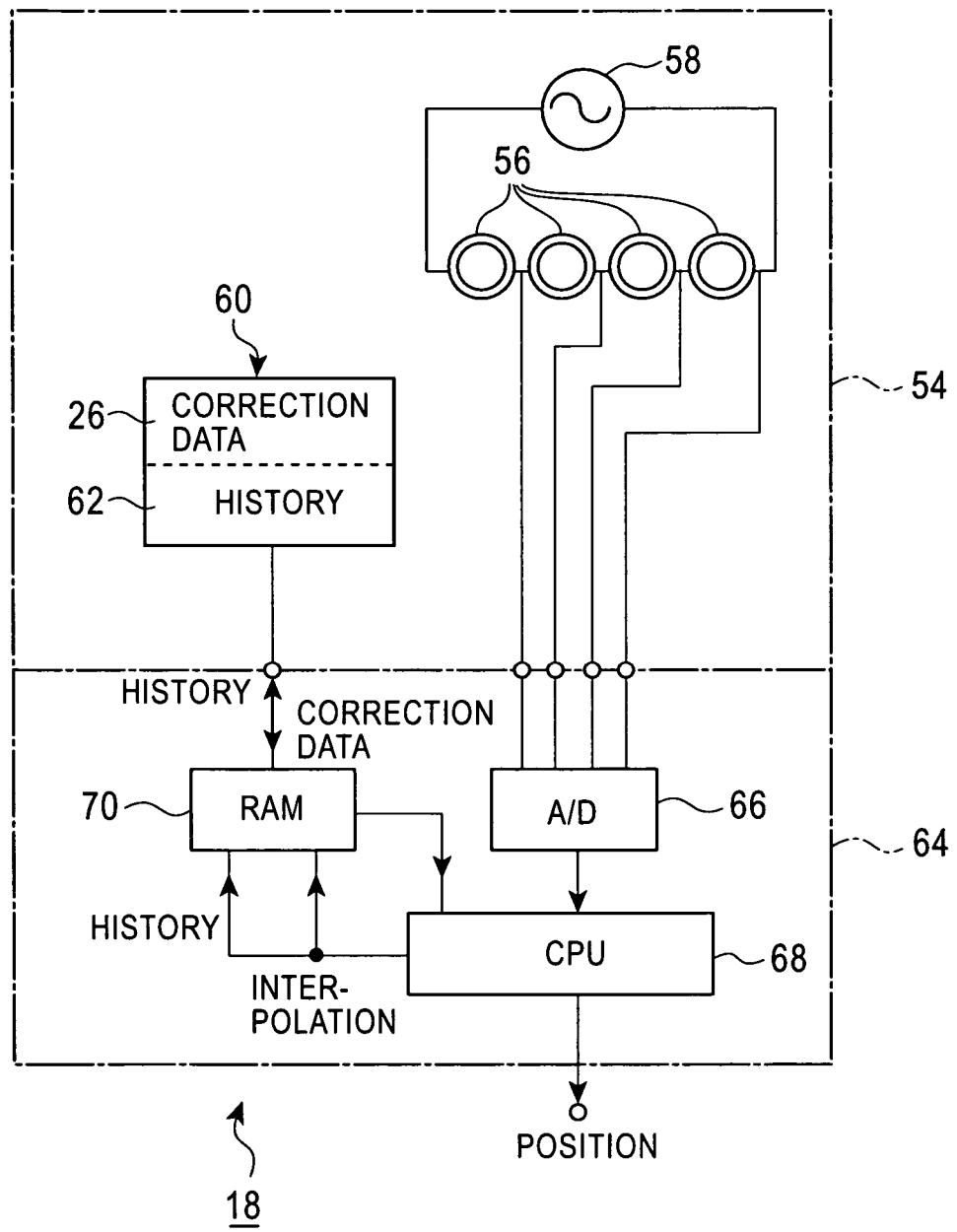
FIG. 3 is a block diagram of a linear sensor used in the embodiment.

FIG. 3 shows the configuration of the linear sensor 18. In a sensor head 54, a plurality of detection coils 56 are arranged in a line and are covered with a magnetic substance or the like. An alternating current power source 58 applies an alternating current to the detection coils 56. For example, voltages applied to the detection coils are supplied to a converting section 64 as outputs. The mark 14 is composed of a magnetic substance such as steel or a nonmagnetic substance such as copper or aluminum. When the mark 14 enters the cover of the detection coils 56 and appears at a position opposite to the detection coils 56, the magnetic coupling between the detection coils 56 and the mark 14 changes depending on the position. This enables the determination of the absolute position of the linear sensor 18 based on the mark 14. 60 is a nonvolatile memory composed of an EEPROM or FlashROM. The linear sensor correction data storage section 26 and a history storage section 62 are provided to store the time when the linear sensor 18 started to be used, the total amount of time for which the linear sensor 18 has been used, the types of troubles such as errors (error codes), the time when each of the troubles such as errors occurred, and the like. The linear sensor correction data storage section 26 stores correction data for each sensor head 54 before being assembled to the converting section 64.

In the converting section 64, for example, an AD converter 66 subjects the voltage of each detection coil 56 to an AD conversion. For example, a CPU 68 composed of a digital signal processor or the like determines the absolute position of the linear sensor 18 with respect to the mark 14. For example, when the angular frequency of the alternating current power source 58 is defined as ω and the phase of the detection coils 56 with respect to the mark 14 is defined as θ, a signal sin θ·sin ωt or cos θ·cos ωt is obtained as described in the Unexamined Japanese Patent Application Publication (Tokkai) No. 2001-174206, the Unexamined Japanese Patent Application Publication (Tokkai) No. 2003-139563 and the Unexamined Japanese Patent Application Publication (Tokkai) No. 2003-156364. The phase θ can then be determined from the signal.

To reduce the amount of date in the linearg sensor correction data storage section 26, the linear sensor correction data storage section 26 stores a correction table for the phase obtained by the detection coils 56 and the actual phase, for a relatively small number of, for example, several to about ten points. Then, upon power-on or the like, the CPU 68 processes and interpolates the data. The correction data interpolated is stored in a RAM 70 or the like. Further, every time a trouble occurs, the CPU 68 stores the corresponding error code, the occurrence time, and the like in the RAM 70. The CPU 68 then takes these data out of the RAM 70 and writes them to the history storage section 62 via an interface (not shown in the drawings).

Figure 4:
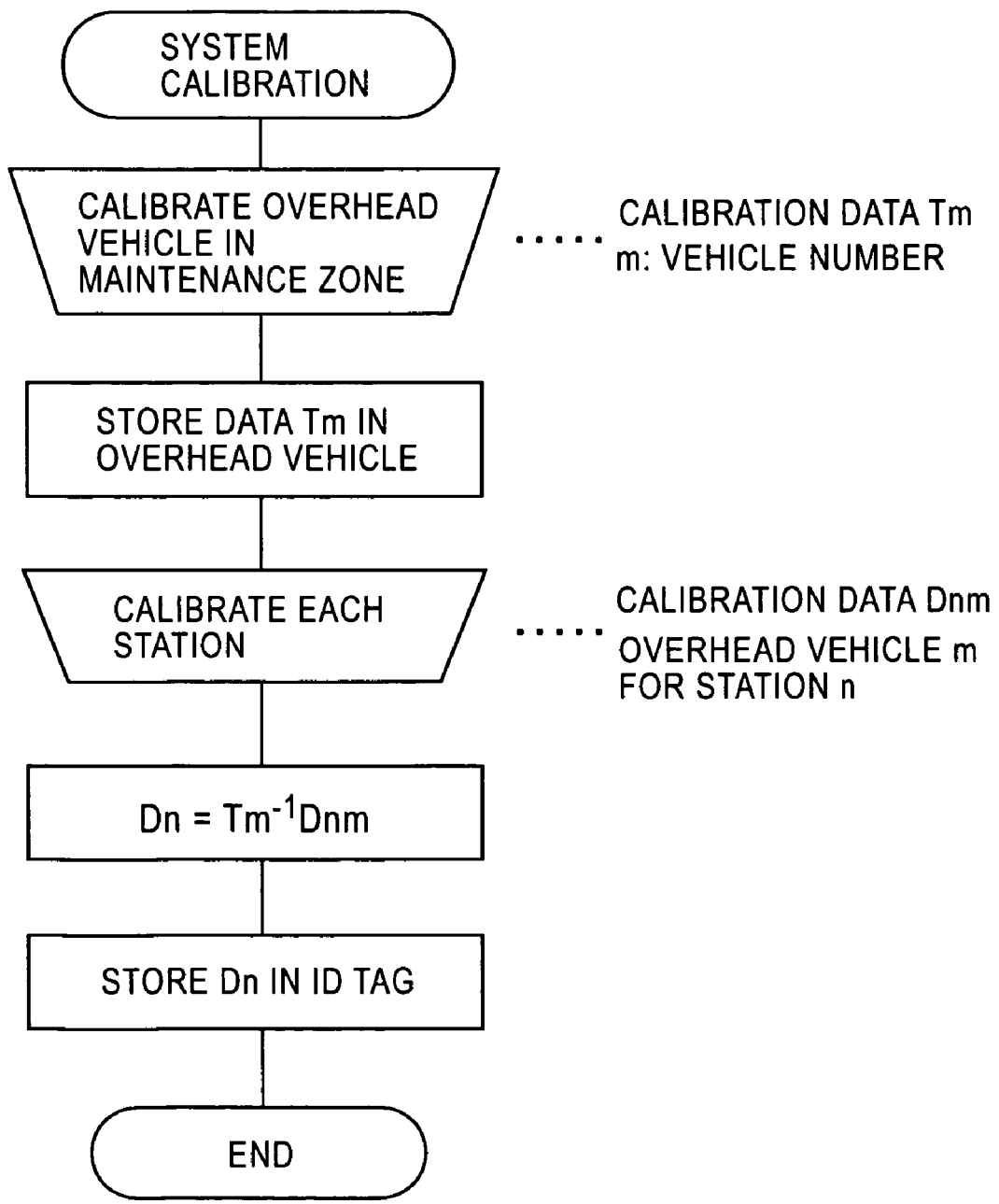
FIG. 4 is a flowchart showing an algorithm used to calibrate an overhead vehicle system.

FIG. 4 shows the calibration of the whole overhead vehicle system. If only the overhead vehicle is to be calibrated, it is only necessary to process that part. Further, if stations are to be added, it is only necessary to calibrate the stations added. The number of the overhead vehicle is denoted (m) and the number of each station is denoted (n). The actual control data depends on the combination of an overhead vehicle and a station. When the actual control data is defined as Dnm, the relationship Dnm=Tm·Dn is established as previously described.

Each overhead vehicle is calibrated in the maintenance zone. The calibration is executed on at least the transfer control data. In addition, the stoppage control data may be calibrated. It is assumed that for the ideal overhead vehicle, the correction data is zero, that is, the matrix Tm is zero. Then, a deviation obtained on the basis of the ideal overhead vehicle is stored for each overhead vehicle using the matrix Tm. An appropriate overhead vehicle is selected from the large number of overhead vehicles. Then, each station is calibrated. Control data is determined which is required to allow the overhead vehicle to accurately stop at each station and then to carry out an accurate transfer. This control data is based on the combination of the overhead vehicle and the station. The data is thus expressed using the matrix Dnm. By using an inverse matrix Tm−1 of the matrix Tm which represents the deviation of the overhead vehicle from the ideal carriage, it is possible to obtain the control data Dn (Dn=Tm−1·Dnm) for each station with respect to the ideal carriage. The control data is them stored in the ID tag. the control data Dn does not depend on the overhead vehicle used for calibration. For backup, the correction data Tm for each overhead vehicle and the control data Dn for each station are stored in the ground side controller.

Figure 5:
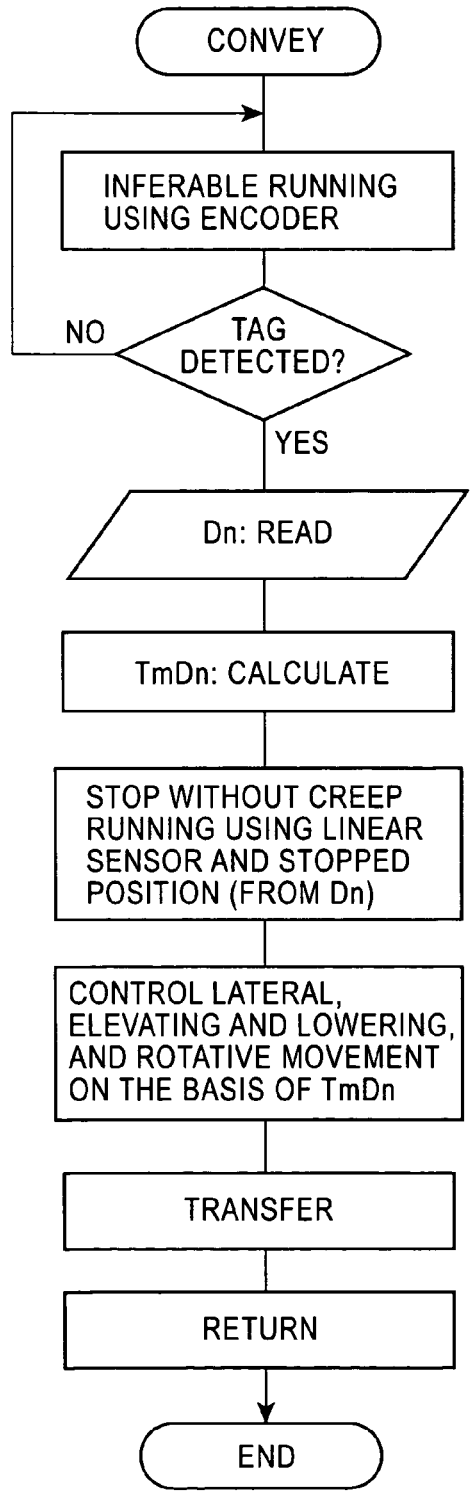
FIG. 5 is a flowchart showing an algorithm for controlling the running between stations.

FIG. 5 shows an algorism for conveyance from station to station. The overhead vehicle calculates the distance it must run before reaching the destination station, on the basis of a map (not shown in the drawings). The overhead vehicle then uses an encoder to monitor the number of rotations of running wheels, the number of rotations of a running servo motor, and the like.

The overhead vehicle runs inferably while determining the current running distance. Upon detecting an ID tag, the overhead vehicle reads the control data Dn for each station. The overhead vehicle then used its own correction matrix Tm with respect to the ideal carriage to calculate the data Tm·Dn. The overhead vehicle then uses a signal for a stopped position determined from the data Dn (the stopped position based on the mark) and for the linear sensor to stop without creep running. With the linear sensor 18, the overhead vehicle can stop with an accuracy of, for example, about ±1 mm without creep running. This makes it possible to reduce the amount of time until stoppage by about 5 seconds, which are required for the creep running. The data Tm·Dn is used to control a transfer; the transfer is carried out by controlling the lateral movement of the elevation and lowering driving section as well as the elevation and lowering and rotative movement of the chuck portion. After the transfer, the overhead vehicle reverses its direction by an amount corresponding to the lateral movement, elevating and lowering operation, and rotative moving operation. The overhead vehicle thus returns to finish the conveyance.

In the embodiment, the overhead vehicle is shown. However, the present invention is applicable to a ground running rail guided vehicle or stacker crane, or a trackless automatic guided vehicle. Further, since the overhead vehicle comprises the transfer device, each ID tag stores the stoppage control data and the transfer control data. However, if the overhead vehicle has no transfer device, the ID tag has only to store the stoppage control data. Moreover, the overhead vehicle may inquire or the ground side controller to receive the control data from it.

The embodiment produces the effects described below.

(1) The ID tag stores the stoppage control data and the transfer control data. The overhead vehicle reads the control data for each station. Thus, the overhead vehicle need not store these data. It is also possible to change these data without being conscious of the storage in the overhead vehicle. Moreover, the overhead vehicle need not inquire of the ground side controller before stoppage.

(2) The ID tag stores the control data with respect to the ideal carriage. The overhead vehicle stores its own correction data with respect to the ideal carriage. This eliminates the need to store the control data for the combinations of the stations and the overhead vehicles. The control data with respect to the ideal carriage is independent of the individual overhead vehicles. Accordingly, for example, even if the overhead vehicle used for calibration is scrapped, the control data with respect to the ideal carriage continues to be effective.

(3) The sensor head alone of the linear sensor can be replaced with a new one separately from the converting section. Further, when the sensor head is replaced with a new one, it is unnecessary to experimentally run the overhead vehicle to obtain correction data again.

(4) The overhead vehicle is controllably stopped while using the position sensor such as the linear sensor to detect the absolute position of the sensor with respect to the mark provided near the station.

(5) The linear sensor enables the overhead vehicle to stop with an accuracy of, for example, about 1 mm. The speed signal can also be obtained from the linear sensor. This eliminates the need to rely on an inaccurate speed signal from the encoder.

(6) The mark has only to be provided in front of or at the stopped position. The mark need not be provided all over the running route. Sufficient running control can be performed between the marks using inferable control performed by the encoder.

(7) Since the mark is provided in front of or at the stopped position, the overhead vehicle can run at low speed near the mark to accurately read the mark.

(8) The ID tag stores the stoppage control data based on the mark. Accordingly, the stoppage control data is not affected by the accuracy of the position at which the mark is attached. This facilitates the installation of the mark.

The invention claimed is:

1. A carriage system, comprising:
    a plurality of ID tags, each configured to store stoppage control data required to stop a carriage at one of a plurality of predetermined stop positions, said ID tags being separate from said carriage, and
    said carriage configured to run along a predetermined path to said plurality of predetermined stop positions, said carriage comprising:
        an ID reader configured to receive or read the stoppage control data from said ID tags,
        a running driving section configured to stop said carriage at said predetermined stop positions based on the stoppage control data, and
        a stopping position sensor which includes a correction data storage section configured to store correction data for said position sensor.

2. The carriage system according to claim 1, wherein each of said plurality of ID tags is disposed upstream of corresponding predetermined stop position, so that said carriage can read the stoppage control data from said ID tag.

3. The carriage system according to claim 1, further comprising a mark positioned at each said predetermined stop position,
    wherein said stopping position sensor is configured to detect the absolute position of said stopping position sensor with respect to said mark, and
    wherein said stoppage control data includes stoppage data based on said mark.

* * * * *